United States Patent [19]

Matner et al.

[11] 4,001,163

[45] Jan. 4, 1977

[54] STYRENE-BUTADIENE COPOLYMER LATICES CONTAINING CARBOXYL GROUPS

[75] Inventors: Martin Matner, Odenthal; Ernst Schwinum, Leichlingen; Ludwig Mott, Leverkusen, all of Germany

[73] Assignee: Bayer Aktiengesellschaft, Leverkusen, Germany

[22] Filed: Apr. 11, 1975

[21] Appl. No.: 567,358

[30] Foreign Application Priority Data

Apr. 17, 1974 Germany .......................... 2418419

[52] U.S. Cl. ................... 260/29.7 T; 260/29.7 SQ
[51] Int. Cl.² ....................................... C08L 25/10
[58] Field of Search .............. 260/29.4 UA, 29.7 T, 260/29.7 SQ

[56] References Cited

UNITED STATES PATENTS

| 3,344,103 | 9/1967 | Eilbeck et al. ................. 260/29.7 T |
| 3,817,899 | 6/1974 | Turch ........................... 260/29.7 T |

FOREIGN PATENTS OR APPLICATIONS

| 1,014,227 | 12/1965 | United Kingdom ........... 260/29.7 T |

*Primary Examiner*—M. J. Welsh
*Attorney, Agent, or Firm*—Connolly and Hutz

[57] ABSTRACT

Low-foam carboxylated styrene-butadiene-latices obtained by the emulsion polymerization of monomer mixtures of:

73.5 to 18.5 parts by weight of butadiene;
20 to 80 parts by weight of styrene;
0 to 10 parts by weight of acrylonitrile;
0 to 5 parts by weight of ethylenically unsaturated carboxylic acid amides or methylol derivatives thereof; and
1.5 to 10 parts by weight of ethylenically unsaturated carboxylic acids;

wherein the ethylenically unsaturated carboxylic acids consist of a mixture of:

1.0 to 4 parts by weight of acrylic acid and
0.5 to 6 parts by weight of methacrylic acid and wherein less than 0.5 parts by weight of anionic emulsifiers are used for polymerisation. The latices can be used inter alia as an impregnating material for soft non-wovens, cardboards and fiber fleece carpets.

9 Claims, No Drawings

STYRENE-BUTADIENE COPOLYMER LATICES CONTAINING CARBOXYL GROUPS

The production of aqueous polymer latices containing carboxyl groups is described, for example, in U.S. Pat. No. 2,724,707. Latices of this type are commercially available. Among these carboxyl-containing polymer latices, styrene-butadiene copolymer latices in particular are used on a commercial scale for coating paper, for stabilizing non-wovens and for backing carpets. These latices tend to form stable foams which give rise to considerable difficulties during processing, for example in high-speed machines.

Foaming is attributable to the low surface tension of the latices which in turn is caused by the emulsifiers present in the latices. Accordingly, it would be desirable to have latices with the lowest possible emulsifier content. However, if the quantity of emulsifier is reduced during preparation of the latices, their stability becomes inadequate.

Emulsion polymerization in the absence of emulsifiers is already known. However, latices obtained in this way are not reproducible and have a high gel content. The gel accumulates in the form of coarse precipitates and, especially, in the form of microcoagulate with particle diameters of from 10 to 200μ.

The present invention relates to latices of polymers with carboxyl groups which contain a copolymer of:
- 73.5 to 18.5 parts, by weight, of butadiene;
- 20 to 80 parts, by weight, of styrene;
- 0 to 10 parts, by weight, of acrylonitrile;
- 0 to 5 parts, by weight, of ethylenically unsaturated carboxylic acid amides or methylol derivatives thereof;
- 1.0 to 4 parts, by weight, of acrylic acid; and
- 0.5 to 6 parts, by weight, of methacrylic acid;

and which are stabilized with less than 0.5 parts, by weight, of an anionic emulsifier per 100 parts, by weight, of copolymer.

The latices according to the invention are free from microgel, are very stable and undergo little or no foaming.

The invention also relates to a process for producing latices containing carboxyl groups by polymerizing a mixture of:
- 73.5 to 18.5 parts, by weight, of butadiene;
- 20 to 80 parts, by weight, of styrene;
- 0 to 10 parts, by weight of acrylonitrile;
- 0 to 5 parts, by weight, of ethylenically unsaturated carboxylic acid amides or methylol derivatives thereof; and
- 1.5 to 10 parts, by weight, of ethylenically unsaturated carboxylic acid;

in aqueous emulsion in the presence of a radical-forming catalyst and in the presence of an emulsifier, distinguished by the fact that the ethylenically unsaturated carboxylic acid is a mixture of:
- 1.0 to 4 parts, by weight, of acrylic acid and
- 0.5 to 6 parts, by weight, of methacrylic acid, and the emulsifier is an anionic emulsifier used in a quantity of less than 0.5 parts, by weight, per 100 parts, by weight, of monomer.

Suitable ethylenically unsaturated carboxylic acid amides are, in particular, acryl amide, methacryl amide or the methylol derivatives thereof, such as N-methylol(meth)acryl amide, N-methoxymethyl(meth)acryl amide and (meth)acrylamidomethylene carbamic acid ethyl ester.

The choice of the ethylenically unsaturated carboxylic acid is a critical factor in the formation of low-emulsifier latices from the above-mentioned monomers. The required property combination cannot be obtained with only one carboxylic acid. Contrarily, stable, non-separating latices are obtained with the combination of acrylic acid and methacrylic acid, even with emulsifier concentrations of less than 0.5%, by weight, (based on monomer). Acrylic acid and methacrylic acid together make up from 1.5 to 10%, by weight, and preferably from 1.5 to 6%, by weight of the monomer total. The ratio, by weight, of acrylic acid to methacrylic acid may be varied from 1 : 5 to 5 : 1 and preferably from 1 : 2 to 2 : 1.

The quantity of the anionic emulsifiers used for polymerization is less than 0.5% (based on monomer) and preferably from 0.05 to 0.4%. Conventional anionic emulsifiers can be used, for example alkali salts of long-chain alkyl sulphonates, alkyl aryl sulphonates or long-chain alkyl sulphates. It is preferred to use salts of alkyl sulphates, such as sodium lauryl sulphate, ammonium lauryl sulphate, or the alkali metal salts of the sulphates of mixtures of saturated or unsaturated fatty alcohols.

The latices according to the invention are preferably prepared by polymerization in aqueous emulsion in a "semi-continuous monomer run-in process." In this process, a portion of the monomers, generally from 5 to 25% of the total quantity, is initially introduced, to the reaction vessel, polymerization initiated by the addition of activator and the remainder of the monomers is then added continuously according to the conversion. The acrylic and methacrylic acid content of that portion of the monomer mixture which is initially introduced may be higher than in that portion which is subsequently added. However, it is important to keep to the total quantity. It has proved to be of particular advantage to add continuously an aqueous activator solution during polymerization in addition to the monomers. Polymerization is generally continued up to a conversion in excess of 90 %. Unpolymerized monomers are removed, e.g., by steam stripping which also serves for deodorizing. In order to regulate the molecular weight of the polymer, the conventional modifiers, such as mercaptans (tert.-dodecyl mercaptan, n-dodecyl mercaptan and octyl mercaptan), halogenated hydrocarbons (carbon tetrachloride, chloroform and bromoform) or even aliphatic alcohols and aldehydes (formaldehyde and methanol) may also be added during polymerization in quantities of, for example, from 0.5 to 8 %, based on the monomer mixture.

The conventional water-soluble radical formers, more especially the alkali metal salts and ammonium salts of peroxo-disulphuric acid (for example ammonium persulphate and potassium persulphate), are used to activate the polymerization reaction. Reducing agents, such as formaldehyde sulphoxylate or sodium bisulphite, may also be used in relatively small quantities.

Polymerization is advantageously carried out at temperatures of from 75° to 98° C and preferably at temperatures of from 80° to 95° C. During polymerization the pH-value is maintained at from 2 to 6 by the addition of alkali. On completion of polymerization, a pH-value of from 6.5 to 10 may be adjusted by adding more alkali. In addition, the conventional additives, such as anti-ageing agents and bactericides, may be added to the latex on completion of polymerization.

In general, the quantity of water used for polymerization is such that the latices have a solids concentration of from 40 to 60%.

The physical data quoted in the following Examples were determined as follows:

Average particle diameter: $d_{50}$-value by light scattering in accordance with Makromol Chem. 69 (1963), pages 213 and 220. Viscosity: Brookfield viscosimeter, spindle 1, 30 rpm, in cP Surface tension: with Dr. Traube's stalagmometer, in dyne/cm. Mechanical stability: in accordance with DIN 53 567, a latex sample is exposed to the shear stress of a disc rotating at 14,000 rpm ± 200 rpm, beginning at 35° C, in the apparatus described in DIN 53 567. The formation of microcoagulate or of coarse coagulum is assessed by filtration and weighing out after a shear stress of 10 minutes.

EXAMPLE 1

The following ingredients are introduced into a 250 liter capacity stainless steel autoclave equipped with a stirrer, thermometer and thermostat:

43 kg of deionized water, 80 g of potassium persulphate, 80 g of Na-lauryl sulphate, 8 g of the Na-salt of ethylene diamine tetraacetic acid and 320 g of sodium hydroxide. Following the introduction of nitrogen to create a nitrogen atmosphere, the following components are introduced into the autoclave: 3.2 kg of butadiene, 4.0 kg of styrene, 400 g of acrylic acid, 400 g of methacrylic acid and 100 g of tert.-dodecyl mercaptan. The temperature is then increased, with stirring, to 95° C over a period of 2 hours, followed by stirring at that temperature for 30 minutes. The following two inflows are then uniformly introduced over a period of 8 hours:

1. monomer influx of 52.8 kg of butadiene, 16.0 kg of styrene, 2 kg of acrylic acid, 1.2 kg of methacrylic acid and 800 g of tert.-dodecyl mercaptan;
2. aqueous influx of 29 kg of deionized water and 720 g of potassium persulfphate.

The internal temperature of the autoclave is maintained at 95° C during the addition of these two inflows and also for another 2 hours thereafter. A solution of 80 g of potassium persulphate in 1.6 kg of deionized water is then added for reactivation, followed by stirring for another 4 hours at 95° C. After cooling, the latex is stabilized with 800 g of a 50% emulsion of a standard commercial-grade phenolic anti-ageing agent, and adjusted to pH 9.0 by the addition of semi-concentrated ammonia water. The 52% latex (solid) is freed from residues of unpolymerized monomers by stripping with steam.

The latex obtained is free from "specks" and coarse deposits. It has a surface tension of 50 dyne/cm, a viscosity of 93 cP and an average particle diameter of 220 nm. The mechanical stability of the latex is very good. No coagulation is observed after 10 minutes. The latex is suitable for use as an impregnating material for soft non-wovens.

EXAMPLE 2

The following ingredients are introduced into a 2 m³ capacity stainless steel autoclave equipped with a stirrer, thermometer and thermostat: 480 kg of deionized water, 0.8 kg of potassium persulphate, 0.6 kg of sodium lauryl sulphate, 0.1 kg of the sodium salt of ethylene diamine tetraacetic acid and 2 kg of sodium hydroxide. Following the introduction of nitrogen to create a nitrogen atmosphere, the autoclave is heated to 40° C and the following monomer mixture is introduced: 48 kg of styrene, 24 kg of butadiene, 4 kg of methacrylic acid, 4 kg of acrylic acid, 3 kg of carbon tetrachloride and 1 kg of methanol. The internal temperature is increased, with stirring to 80° C over a period of 1 hour, and maintained at that level for another hour. The following two inflows are then uniformly introduced, with stirring, over a period of 10 hours at an internal temperature of 80° C:

1. monomer mixture of 110 kg of butadiene, 590 kg of styrene, 12 kg of methacrylic acid, 8 kg of acrylic acid, 10 kg of carbon tetrachloride and 5 kg of methanol; and
2. aqueous solution of 240 kg of deionized water, 7 kg of potassium persulphate and 5 g of the sodium salt of ethylene diamine tetraacetic acid.

After stirring for 4 hours at 80° C, the 51% latex obtained is adjusted to pH 8.5 with 10% sodium hydroxide solution and stabilized with 5 kg of a 50% emulsion of a standard commercial-grade phenolic anti-ageing agent. The latex is freed from traces of unpolymerized monomers by stripping with steam. The latex obtained is substantially free from specks and coarse deposits. It has a high surface tension of 48 dyne/cm, a low viscosity of 30 cP and an average particle diameter of 280 nm. When the latex was tested for mechanical stability, no formation of microcoagulate or of coarse coagulum was observed after 10 minutes. The latex is suitable for use inter alia as an impregnating agent for cardboards which can be shaped by heat and are used for example for capping shoes.

EXAMPLE 3

The following ingredients are introduced into a 40 liter capacity stainless steel autoclave equipped with a stirrer, thermometer and thermostat: 9600 g of deionized water, 16 g of potassium persulphate, 1.6 g of the Na salt of ethylene diamine tetraacetic acid, 16 g of the Na salt of a mixture of $C_{10} - C_{16}$ fatty alcohol sulphates and 60 g of sodium hydroxide. The reactor is flushed with nitrogen and then heated to an internal temperature of 50° C. The following components are then added: 640 g of butadiene, 960 g of styrene, 80 of methacrylic acid, 80 g of acrylic acid and 100 g of carbon tetrachloride. The temperature is then increased to 90° C, with stirring, and maintained at that level for 1 hour. Thereafter, the following two inflows are uniformly introduced, with stirring, over a period of 6 hours:

1. monomer mixture of 6720 g of butadiene, 7040 g of styrene, 240 g of methacrylic acid, 240 g of acrylic acid, 400 g of carbon tetrachloride and 160 g of methanol; and
2. aqueous solution of 4800 g of deionized water, 144 g of ammonium persulphate, 48 g of the Na salt of a mixture of $C_{10} - C_{16}$ fatty alcohol sulphates and 0.8 g of the Na salt of ethylene diamine tetraacetic acid.

The internal temperature is maintained at 90° C during the addition of these two inflows and also for 6 hours thereafter. The 52% latex obtained is stabilized with 240 g of a 50% emulsion of a standard commercial-grade phenolic anti-ageing agent and adjusted to Ph 8.7 with semi-concentrated ammonia. It is free from specks and coarse deposits. It has a surface tension of 46 dyne/cm, a viscosity of 60 cP and an average particle diameter of 240 nm. When tested for mechanical stability in accordance with DIN 53 567, the latex may be stirred for 10 minutes without any speck formation. The latex is suitable for use inter alia as an impregnating binder for fibre fleece carpets and for consolidating the pile of tufted carpets.

COMPARISON EXAMPLE A

For comparison, a latex containing only 4% of methacrylic acid as polymerisable carboxylic acid was prepared in accordance with the recipe of Example 3:

Comparison latex A: the mixture contained approximately 6 kg of coarse coagulum and was interspersed with fine microcoagulate. The stirrer, thermometer tube and walls of the reaction vessel were heavily covered with deposits.

COMPARISON EXAMPLE B

For comparison, a latex containing only 4 % of acrylic acid as polymerizable carboxylic acid was prepared in accordance with the recipe of Example 3.

Comparison latex B: following pH adjustment of pH 8.8, a latex was obtained which could no longer be handled on account of its viscosity of 1200 cP (Brookfield, spindle 1, 3 rpm).

COMPARISON LATEX C

For comparison, a latex was prepared in accordance with the recipe of Example 3, using 160 g (placed in the autoclave) and 160 g (in the aqueous influx) of the Na salt of a mixture of $C_{10} - C_{16}$ fatty alcohol sulphates. This quantity corresponds to 2.0 %, based on 100 parts of monomer, in contrast to the 0.4 % in Example 3.

The latex obtained showed a marked tendency towards foaming and had a low surface tension of 28 dyne/cm, a viscosity of 180 cP and an average particle diameter of 130 nm.

We claim:

1. A carboxyl group-containing polymer latex comprising a copolymer of
   73.5 to 18.5 parts by weight of butadiene,
   20.0 to 80.0 parts by weight of styrene,
   1.0 to 4.0 parts by weight of acrylic acid,
   0.5 to 6.0 parts by weight of methacrylic acid,
   0 to 10.0 parts by weight of acrylonitrile and
   0 to 5.0 parts by weight of at least one ethylenically unsaturated carboxylic acid amide or methylol derivative thereof
   and, as the sole emulsifier in said latex, less than 0.5 parts by weight, per 100 parts by weight of copolymer, of at least one anionic emulsifier.

2. A process for producing a latex as claimed in claim 1 which comprises polymerizing in aqueous emulsion:
   73.5 to 18.5 parts by weight of butadiene,
   20.0 to 80.0 parts by weight of styrene,
   1.0 to 4.0 parts by weight of acrylic acid,
   0.5 to 6.0 parts by weight of methacrylic acid,
   0 to 10.0 parts by weight of acrylonitrile and
   0 to 5.0 parts by weight of at least one ethylenically unsaturated carboxylic acid amide or methylol derivative thereof,
   the polymerization being carried out at a pH of from 2 to 6 in the presence of a radical-forming catalyst and in the presence of, as the sole emulsifier, less than 0.5 parts by weight, per 100 parts by weight of monomer, of at least one anionic emulsifier.

3. A process as claimed in claim 2 in which the ethylenically unsaturated carboxylic acid amide or methylol derivative thereof is selected from the group consisting of acryl amide, methacryl amide, N-methylol-(meth)acryl amide, N-methoxymethyl(meth)acryl amide, and (meth)acrylamidomethylene carbamic acid ethyl ester.

4. A process as claimed in claim 2 in which the sum of acrylic acid and methacrylic acid present is from 1.5 to 6%, by weight, of the monomer total.

5. A process as claimed in claim 2 in which the ratio, by weight, of acrylic acid to methacrylic acid is from 1 : 2 to 2 : 1.

6. A process as claimed in claim 2 in which the quantity of anionic emulsifier used is from 0.05 to 0.4%, based on monomer.

7. A process as claimed in claim 2 in which the anionic emulsifier is sodium lauryl sulphate or ammonium lauryl sulphate.

8. A process as claimed in claim 2 in which the polymerization is carried out at a temperature of from 75° to 98° C.

9. A process as claimed in claim 8 in which the temperature is from 80° to 95° C.

* * * * *